(12) United States Patent
Wood

(10) Patent No.: US 9,805,033 B2
(45) Date of Patent: Oct. 31, 2017

(54) POPULATION OF CUSTOMIZED CHANNELS

(71) Applicant: Roku, Inc., Saratoga, CA (US)

(72) Inventor: Anthony Wood, Palo Alto, CA (US)

(73) Assignee: ROKU, INC., Los Gatos, CA (US)

( * ) Notice: Subject to any disclaimer, the term of this patent is extended or adjusted under 35 U.S.C. 154(b) by 309 days.

(21) Appl. No.: 14/216,867

(22) Filed: Mar. 17, 2014

(65) Prior Publication Data

US 2014/0372464 A1 Dec. 18, 2014

Related U.S. Application Data

(63) Continuation of application No. 13/921,029, filed on Jun. 18, 2013, now abandoned.

(51) Int. Cl.
G06F 17/30 (2006.01)
H04L 12/18 (2006.01)
G06F 3/0481 (2013.01)

(52) U.S. Cl.
CPC ...... G06F 17/30029 (2013.01); G06F 3/0481 (2013.01); H04L 12/1813 (2013.01)

(58) Field of Classification Search
CPC ............. G06F 17/30867; G06F 3/0481; H04L 12/581; H04L 12/1813
See application file for complete search history.

(56) References Cited

U.S. PATENT DOCUMENTS

| | | |
|---|---|---|
| 5,430,493 A | 7/1995 | Kim |
| 5,818,439 A | 10/1998 | Nagasaka et al. |
| 8,499,256 B1 * | 7/2013 | Iten ..................... H04N 21/4821 715/810 |
| 8,935,713 B1 * | 1/2015 | Gabel .................... H04H 60/65 705/14.53 |
| 2003/0020750 A1 * | 1/2003 | Brown .............. G06F 17/30867 715/752 |
| 2004/0250294 A1 | 12/2004 | Kim |
| 2005/0201254 A1 | 9/2005 | Looney et al. |
| 2006/0025148 A1 * | 2/2006 | Karaoguz .............. H04H 20/57 455/452.2 |
| 2008/0104246 A1 * | 5/2008 | Katz ...................... G06Q 30/00 709/226 |
| 2009/0018917 A1 * | 1/2009 | Chapman ............... G06Q 30/02 705/14.46 |
| 2009/0047000 A1 * | 2/2009 | Walikis ............. G06F 17/30053 386/238 |
| 2009/0156181 A1 * | 6/2009 | Athsani ................... H04L 12/58 455/414.2 |
| 2009/0276318 A1 * | 11/2009 | Broadbent ......... G06Q 30/0267 705/14.64 |

(Continued)

OTHER PUBLICATIONS

Non-Final Office Action for U.S. Appl. No. 14/582,117, dated Dec. 8, 2015; 8 pages.

*Primary Examiner* — Steven Sax
(74) *Attorney, Agent, or Firm* — Sterne, Kessler, Goldstein & Fox P.L.L.C.

(57) ABSTRACT

A method includes associating a channel with a profile, where the channel is configured for use with a client device. The client device detects the channel as a new customized channel based on the profile. A new customized channel icon configured to represent the new customized channel is generated. The new customized channel icon is displayed on a screen via the client device.

20 Claims, 5 Drawing Sheets

(56) References Cited

U.S. PATENT DOCUMENTS

| | | | |
|---|---|---|---|
| 2009/0291677 A1* | 11/2009 | Lauby | G11B 27/322 |
| | | | 455/418 |
| 2009/0293091 A1* | 11/2009 | Shum | G06F 17/30041 |
| | | | 725/87 |
| 2010/0153453 A1* | 6/2010 | Knowles | G06F 17/30867 |
| | | | 707/784 |
| 2011/0178863 A1* | 7/2011 | Daigle | G06Q 30/0231 |
| | | | 705/14.31 |
| 2012/0167127 A1 | 6/2012 | Uchida et al. | |
| 2013/0185175 A1* | 7/2013 | Roozen | G06Q 30/0629 |
| | | | 705/26.64 |
| 2013/0188932 A1* | 7/2013 | Hartley | H04N 9/87 |
| | | | 386/282 |
| 2013/0198788 A1* | 8/2013 | Barger | H04N 21/2668 |
| | | | 725/93 |
| 2014/0181497 A1 | 6/2014 | Dominicus | |

* cited by examiner

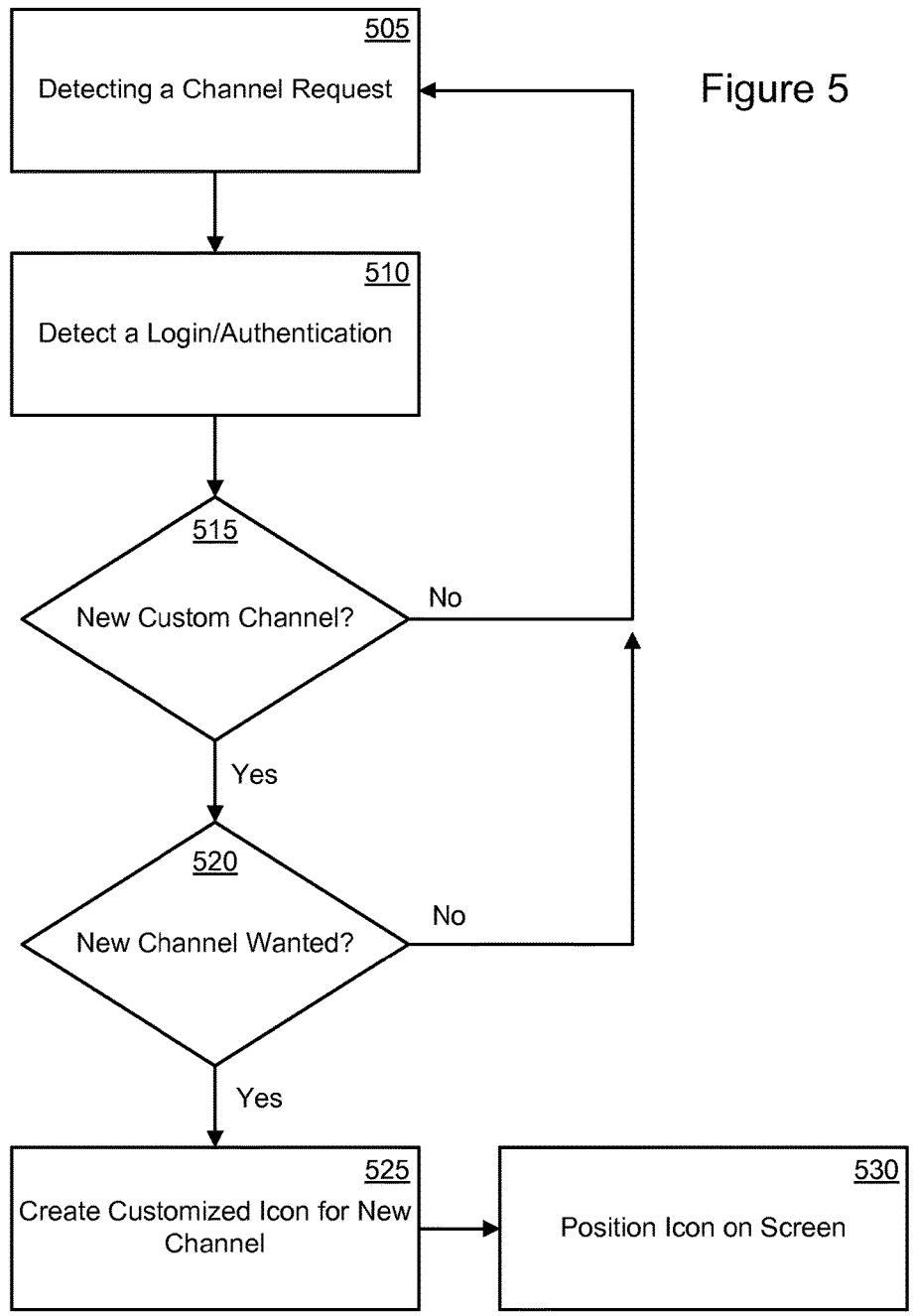

POPULATION OF CUSTOMIZED CHANNELS

CROSS REFERENCE TO RELATED APPLICATIONS

This application is a continuation of U.S. patent application Ser. No. 13/921,029 filed Jun. 18, 2013, the contents of which are incorporated herein by reference.

FIELD OF INVENTION

The invention generally relates to population of channels, and more particularly relates to population of channels in a streaming media environment.

BACKGROUND

Consumers have an increasing amount of on-demand media content available to them. For example, on-demand media content includes visual content (e.g., movies, television shows, still images), audio content (e.g., music), and software applications (e.g., games).

With the increasing amount of available on-demand content, it becomes more challenging for consumer to find and select content of interest. Some consumers find content through browsing through movies through genre categories while others find content through searches for titles, directors, or actors.

Consumers also have an increasing number of choices on where to buy, rent, or consume content without cost. With the increase of available content and content provider choices, it becomes more challenging for the consumer to find the right content from the right content provider. For example, some content is available free for paid subscribed users; other content is available without charge and without a subscription; and yet other content is available for rent or purchase on an individual basis.

SUMMARY

A method includes associating a channel with a profile, where the channel is configured for use with a client device. The client device detects the channel as a new customized channel based on the profile. A new customized channel icon configured to represent the new customized channel is generated. The new customized channel icon is displayed on a screen via the client device.

BRIEF DESCRIPTION OF THE DRAWINGS

The following figures depict various embodiments for illustrative purposes. From the figures and corresponding description, different embodiments may be employed without departing from the invention as described herein.

FIG. 5 illustrates a flow diagram according to one embodiment of the invention.

DETAILED DESCRIPTION

Figure 1:
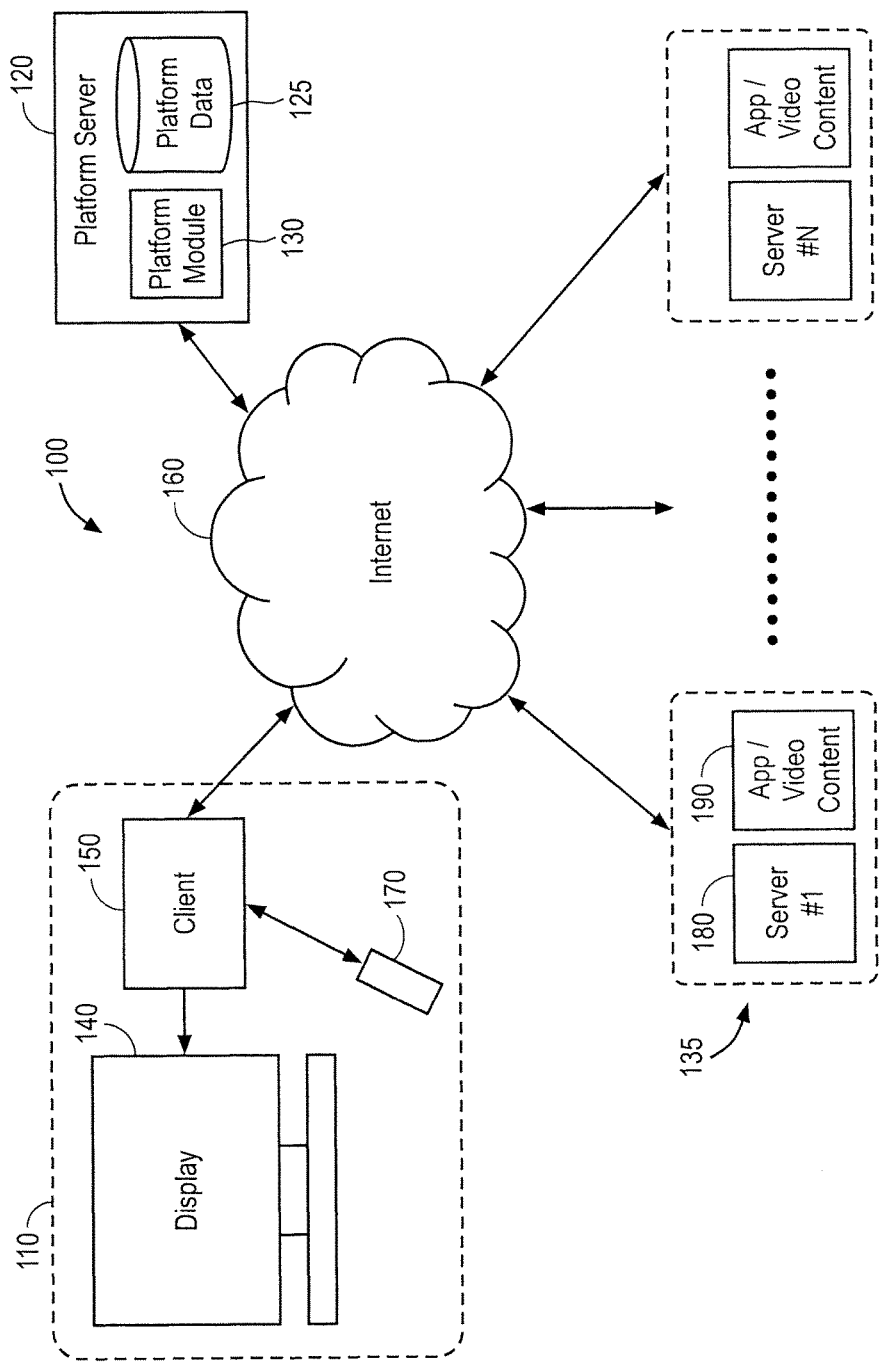
FIG. 1 illustrates a system configured in accordance with an embodiment of the invention.

FIG. 1 illustrates a block diagram of components in a streaming environment 100. In particular, the streaming environment 100 includes an interface system 110, a platform server 120, and one or more sources of content programming 135. In one embodiment, the interface system 110 includes a display device 140 (e.g., computer monitor, television), a client device 150 (e.g., content streaming player), and a user input device 170 (e.g., a remote control). The client device 150 is configured to communicate with the display device 140 and a network 160.

In one embodiment, the platform server 120 includes a database 125 and a platform module 130. The database 125 is configured to store data such as programming software packages. The data within these programming software packages may include: the network locations and content descriptions of content sources 135, hardware/software capabilities of different firmware versions and specifications of the client device 150, customer data associated with each client device 150, and user interface information associated with the client device 150.

In one embodiment, the customer data includes customer specific information such as demographic data, geographic data, ISP identification, and financial information. In one embodiment, the platform server 120 generates customized user interfaces for each of the client devices 150. In one embodiment, the user interface from the platform server 120 provides a selection of content such as audio, visual, and gaming content to the client device 150. In this example, the platform server 120 is configured to supply a graphical representation of the selected content to the client device 150 and further allows the client device 150 to select and access individual content from the selected content from the content source 135 as displayed by the graphical representation.

In one embodiment, the platform server 120 is configured to receive input from client device 150 and processes the input through the platform modules 130. The input from the client device 150 includes navigation and selection commands which may represent selection of content, search for content, and ongoing interaction with an application running on the platform server 120.

In one embodiment, the client device 150 displays content on display device 140. In one embodiment, the content displayed on the display device is sourced from one of the client device 150, the platform server 120, and the content source 135. In one embodiment, the input device 170 transmits signals to the client device 150. In one embodiment, the input device 170 utilizes one of or a combination of: an infrared signal, radio frequency signal, and Bluetooth signal to communicate with the client device 150.

The input device 170 is configured to enter data and to make user selections from the interface as presented through the client device 150. In one embodiment, the interface is shown through the client device 150 is based on the platform server 120, from the content sources 135, or locally from the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets, and mobile computers.

In one embodiment, the content sources 135 include a server 180 and a storage device 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications, and the like. In one embodiment, the particular content which is stored within the storage device 190 is provided to the client device 150 through the network 160. In one embodiment, the network 160 is the Internet. In another embodiment, the network 160 is a local area network.

In one embodiment, the client device 150 makes a request for specific content. If the requested content is video content, the storage device 190 transmits video data that represents the specific video content to the client device 150 through the content source 135.

In one embodiment, platform server 120 supports interfaces, such as login interfaces, search interfaces, and customized interfaces for the client device 150.

Figure 2:
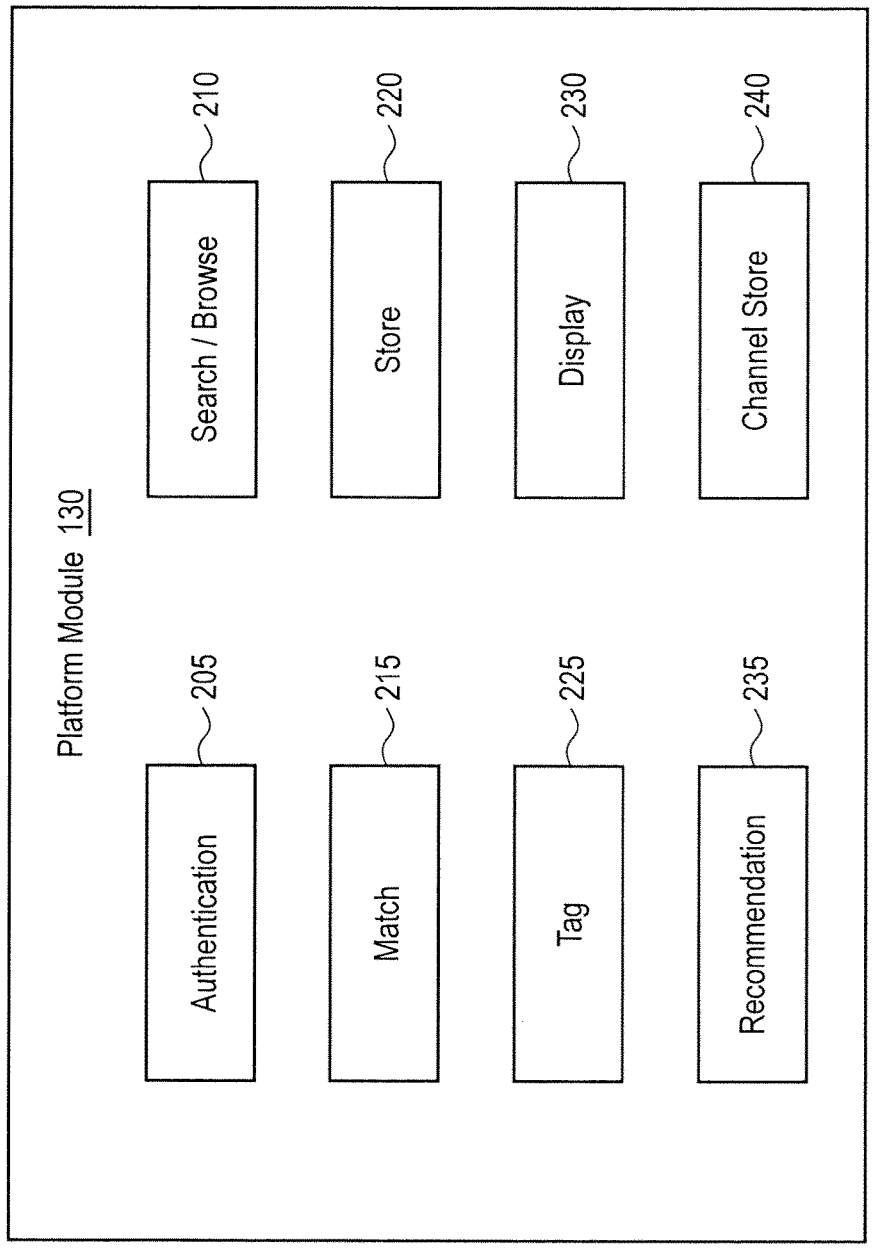
FIG. 2 illustrates platform server modules configured in accordance with an embodiment of the invention.

FIG. 2 illustrates a representative platform module 130. In one embodiment, the platform module 130 includes an authentication module 205, a search/browse module 210, a match module 215, a store module 220, a tag module 225, a display module 230, a recommendation module 235, and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information, and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions, or periodically as needed. In one embodiment, channels of content are utilized after authentication to ensure that the user is allowed to access the content within the channel and to ensure that the proper profile and content is made available for a particular user.

The search/browse module 210 is configured to detect input from a client device 150 and/or the input device 170. In one embodiment, the input represents the selection of a channel, content, or application. In another embodiment, the input represents a textual, visual, or audible search for content, a channel, or application. In yet another embodiment, the input represents browsing content, channels, or applications.

The match module 215 coordinates searches and requests for content, channels, and applications. For example, the match module 215 identifies relevant content, channels, and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, and tags, and friends. Depending on the nature of the data, access to the content is controlled to prevent unauthorized use.

The tag module 225 coordinates the creation and use of tags associated with content, channels, and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and searched by the user creating the tags or the tags can be aggregated among multiple users and searched through a public database by others.

The display module 230 coordinates display of representative content and user interfaces from the platform server 120 to each of the client devices 150. Examples of representative content include listings and descriptions of channels, content and/or applications. Further, the user interface is configured to allow searching and browsing for channels, content and/or applications.

The recommendation module 235 is configured to process content recommendations based on a combination of current subscriptions, browsing or searching input and content source. Further, the recommendation module 235 can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can utilize the subscription data associated with each user account to determine whether the content is available to the user without additional charge because the account user is already subscribed to the content provider. Further, the recommendation module 235 can prioritize content that is available free of charge without any subscriptions. In another embodiment, the recommendation module 235 can prioritize content based on popularity ratings as informed by the public viewing data 335.

The channel store module 240 is configured to manage subscriptions of channels associated with each client device 150. Channels often contain content such as video content and audio content. In one embodiment, access to the content within a channel requires a subscription to that channel and the subscription is free. In another embodiment, access to the content within a channel requires a paid subscription. In yet another embodiment, access to some content and applications require payment and a subscription. In one embodiment, the channel store module 240 manages the addition of channels, content, and applications. Similarly, the channel store module 240 also manages deletion or modifications to channels, content, and application. In combination with the authentication module 205, the channel store is capable of tracking subscriptions of channels that provide content. Further, profile information associated with particular channels for individual users can also be tracked through the channel store module 240.

Figure 3:
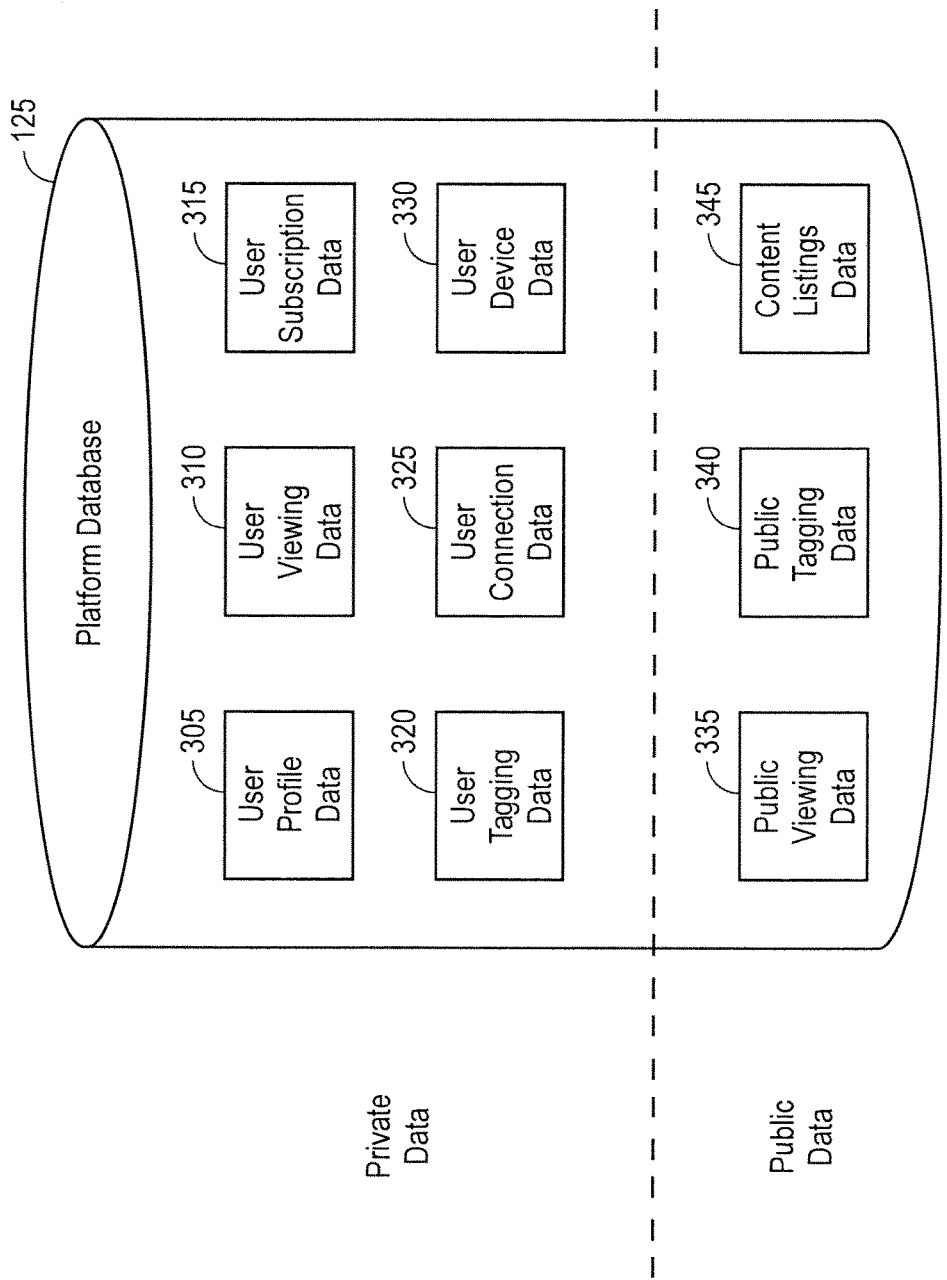
FIG. 3 illustrates a platform database configured in accordance with an embodiment of the invention.

FIG. 3 illustrates a representative platform database 125. In one embodiment, the platform database 125 includes private data and public data. The private data contains information which is identifiable with a particular user; the public data contains information that is aggregated and not identifiable with a particular user. The private data within the platform database 125 includes user profile data 305, user viewing data 310, user subscription data 315, user tagging data 320, user connection data 325, and user device data 330. The public data within the platform database 125 includes public viewing data 335, public tagging data 340, and content listing data 345.

In one embodiment, utilization of the private data is restricted to access within the platform server 120 and access by the particular user corresponding to the private data. Utilization of the public data can be accessed by all users and selected third parties.

The user profile data 305 includes information such as a user's name, address, credit card/payment information, age, and gender. The user viewing data 310 includes the channels, audio content, visual content, video content, and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based, or voice based search. In another embodiment, the stored searches are implicitly identified by recording browsing choices.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags, and applications with other connected users. The user device data 330 includes a listing of devices associated with the particular user. The device includes a client device 150, an input device 170, a mobile device such as a tablet, laptop computer, or smart phone.

The public viewing data 335 includes a listing of channels, content, and applications utilized by many users in aggregate. In one embodiment, the popularity of the content is ranked based on the number of viewers and the order in which the content is viewed. For example, the higher number of views per day for content would indicate higher popularity. Further, when multiple content selections are presented next to each other, the content which is selected first for viewing is given a higher popularity rating.

The public tagging data 340 includes tags that are utilized to describe channels, content, and applications from many users in aggregate. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content, and third party reviews associated with the content.

Figure 4:
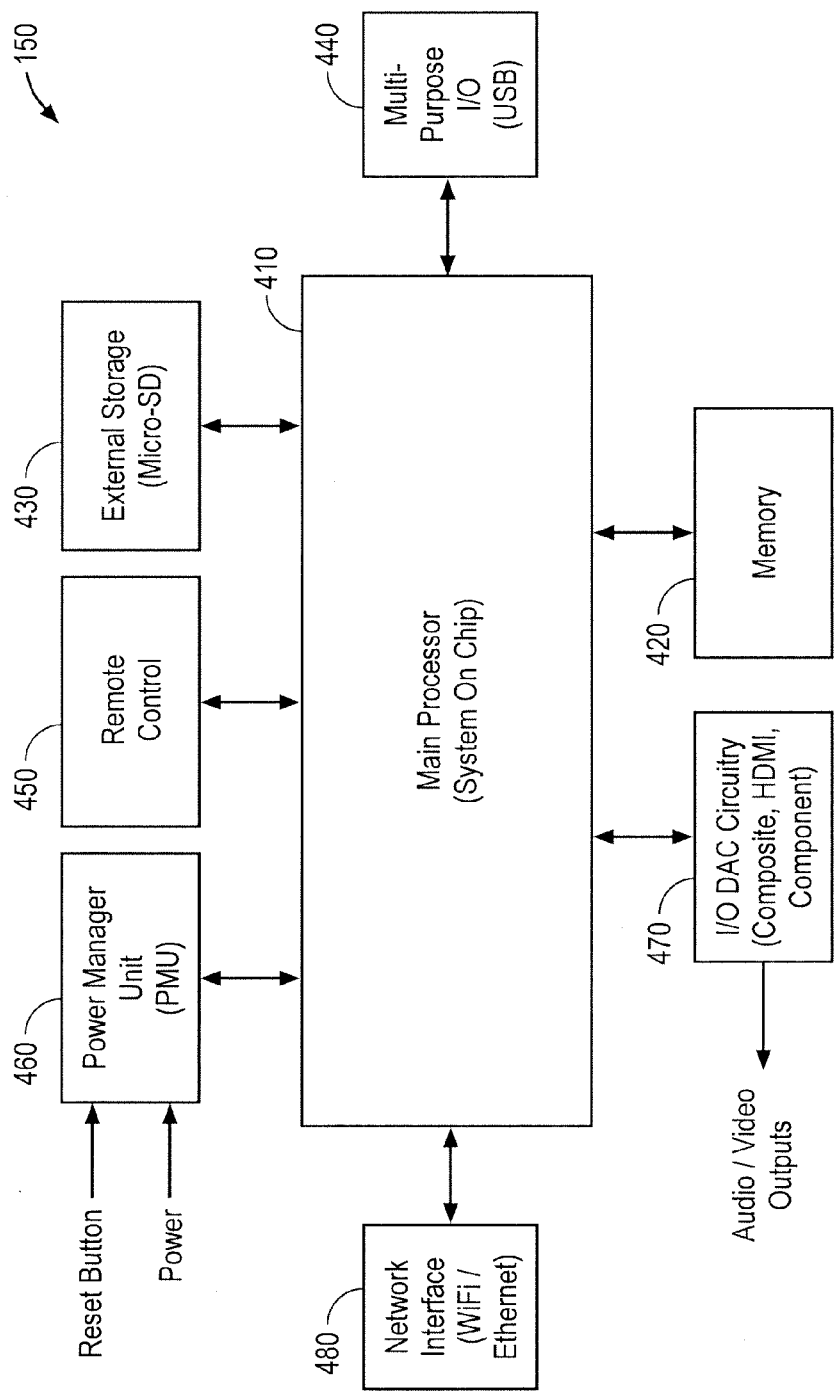
FIG. 4 illustrates a client device configured in accordance with an embodiment of the invention.

FIG. 4 illustrates a block diagram of a representative client device 150. In one embodiment, the client device 150 is configured to stream content into the device. The content streamed into the client device 150 includes audio content, visual content, and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470, and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory, and read only memory (ROM). Additional memory and memory interfaces such as the multi-purpose I/O port 440 may be provided in various embodiments to support memories such as the external storage 430 which can include hard disks, USB drives, SD cards, and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone, and light sensor.

In one embodiment, the I/O interface 470 supports multiple video output options such as HDMI, RGB component video, S-video, DVI, VGA, MHL, and composite video. In one embodiment, USB and Thunderbolt enabled displays are also supported.

In one embodiment, the network interface 480 supports multiple network interfaces such as Ethernet, Wi-Fi, and Bluetooth. In another embodiment, the network interface 480 also supports coaxial, digital TV antenna, and satellite television.

FIG. 5 illustrates a flow diagram showing exemplary embodiments for use with the streaming environment 110 and the platform server 120 as shown in FIG. 1. The blocks within the flow diagrams are shown only for illustrative purposes. For example, blocks within the flow diagram can be further divided, combined or performed in a different order without limiting the scope of the claims.

FIG. 5 illustrates a search for content among multiple content providers through a client device 150 or input device 170 while leveraging the platform server 120. In Block 505, a channel request is detected. In one embodiment, the channel request is initiated through an interface such as the input device 170 operating with the client device 150. In one embodiment, the channel request is an action to initiate or open a channel through the client device 150. By requesting to open or initiate a channel, content within the channel is attempting to be accessed through the client device 150.

In Block 510, a login and/or authentication action is detected. In one embodiment, a login and authentication is used to access the requested channel. For example, the login can identify an individual user and can act as a profile to identify and differentiate usage of the channel by each individual user. The authentication can be in the form of a password to prevent unauthorized users from gaining access to other accounts. In another embodiment, the authentication is not needed and a login is sufficient to identify an individual user. Although an individual user is referenced, a collection of users (such as a family or group) can also utilize a single shared account.

In Block 515, a new custom channel is detected. In one embodiment, a customized channel is a channel through the client device 150 which is associated with a particular login or user. For example, when a user selects a channel such as Pandora® and logs into the user's account, the user is within a custom channel for that particular user. A different user logged into the user's Pandora® account would be another distinct custom channel. Similarly, a group account such as a family account that is logged into the Pandora® account would be yet another distinct custom channel. A matching custom channel is searched via the client device 150. If the current custom channel cannot be matched with an existing custom channel, then a new custom channel is detected. In another embodiment, the customized channel corresponds to a function such as "listening in the living room" instead of a person such that this particular account is associated with "listening in the living room".

If there is no new custom channel detected, then further channel requests are detected within the Block 505. If there is a new custom channel detected within Block 515, then confirmation is requested in Block 520 that the new customized channel is installed and accessible through a display screen through the client device 150.

In Block 525, a new customized icon is created to represent the new custom channel. In one embodiment, the new customized icon includes graphical and/or textual data. For example, the customized icon can contain the name of the profile either graphically or textually to represent the new custom channel. In one instance with the customized channel as a Pandora® instance related to the user Bob, this customized icon can contain the Pandora® logo in combination with the name "Bob". If a different user, such as Jennifer, accesses her profile on Pandora® through the client device 150, then a new custom channel for Jennifer can be detected. Based on confirmation, a new customized icon can be created that represents a new custom channel for Jennifer. The new customized icon can include the name Jennifer or another representation of Jennifer such as a picture or logo. Further, the new customized icon can be completely customizable by the user wherein the new customized icon represents the new customized channel and is displayed for the user to directly access the new customized channel.

In Block 530, the position of the customized icon can reside anywhere on the display 140 operated by the client device 150.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system, comprising:
    a client device including a processor implemented in hardware, the client device configured to detect a channel request through an input device distinct from the client device and communicatively coupled to the client device, wherein the channel request includes identification of a channel associated with video content of a third party content provider, wherein the third party content provider is one of a plurality of distinct third party content providers that provide video content via the channel accessible by the client device; and
    a platform server communicatively coupled to the client device, comprising:
        an authentication module configured to detect a login or authentication action, wherein the login or authentication action is associated with at least the client device and a user account, and wherein the user account includes an account profile that stores user settings and paid content subscription information for the user account; and
        a match module configured to:
            match the channel request and the account profile with an existing customized channel;
            generate a new customized channel associated with the account profile when a match is not found; and
            modify the customized channel according to at least the account profile to make at least the user settings and the paid content subscription information of the account profile available within the customized channel,
        wherein the user settings and the paid content subscription information of the account profile are used to modify a presentation of the video content of the third party content provider within the customized channel and to prioritize the video content of the third party content provider within the customized channel.

2. The system according to claim 1, further comprising a channel store module within the platform server configured to track the existing channel.

3. The system according to claim 1, further comprising a channel store module within the platform server configured to track the new customized channel.

4. The system according to claim 1, wherein the match module is further configured to compare the channel request with the existing channel.

5. The system according to claim 1, wherein the video content of the third party content provider includes at least one of music, video, still pictures, and gaming applications.

6. The system according to claim 1, wherein the user settings include at least payment information associated with the user account.

7. The system according to claim 1, wherein the user settings include at least user viewing data, and wherein the user viewing data includes previously viewed content on the client device.

8. The system according to claim 1, further comprising a search module within the platform module configured to receive the channel request, wherein the channel request includes a textual, visual, or audible search for the channel.

9. The system according to claim 1, further comprising a recommendation module within the platform server configured to recommend video content within the customized channel based on at least the user settings and the paid content subscription information.

10. A computer-implemented method, comprising:
    detecting, by a client device including a processor implemented in hardware, a channel request through an input device distinct from the client device and communicatively coupled to the client device, wherein the channel request includes identification of a channel associated with video content of a third party content provider, wherein the third party content provider is one of a plurality of distinct third party content providers that provide video content via the channel accessible by the client device;
    detecting a login or authentication action, wherein the login or authentication action is associated with at least the client device and a user account, and wherein the user account includes an account profile that stores user settings and paid content subscription information for the user account;
    matching the channel request and the account profile with an existing customized channel;
    generating a new customized channel associated with the account profile when a match is not found; and
    modifying the customized channel according to at least the account profile to make at least the user settings and the paid content subscription information of the account profile available within the customized channel,
    wherein the user settings and the paid content subscription information of the account profile are used to modify a presentation of the video content of the third party content provider within the customized channel and to prioritize the video content of the third party content provider within the customized channel.

11. The method according to claim 10, further comprising tracking the existing channel within a channel store.

12. The method according to claim 10, further comprising tracking the new customized channel within a channel store.

13. The method according to claim 10, wherein the matching further comprises comparing the channel request with the existing channel.

14. The method according to claim 10, wherein the video content of the third party content provider includes at least one of music, video, still pictures, and gaming applications.

15. The method according to claim 10, wherein the user settings include at least payment information associated with the user account.

16. The method according to claim 10, wherein the user settings include at least user viewing data, and wherein the user viewing data includes previously viewed content on the client device.

17. The method according to claim 10, further comprising receiving the channel request at a server, wherein the channel request includes a textual, visual, or audible search for the channel.

18. The method according to claim 10, further comprising recommending video content within the customized channel based on at least the user settings and the paid content subscription information.

19. A non-transitory computer-readable storage medium having instructions stored thereon that, when executed by at least one computing device, causes the at least one computing device to perform operations comprising:
    detecting, by a client device, a channel request through an input device distinct from the client device and communicatively coupled to the client device, wherein the channel request includes identification of a channel associated with video content of a third party content provider, wherein the third party content provider is one of a plurality of distinct third party content providers that provide video content via the channel accessible by the client device;
    detecting a login or authentication action, wherein the login or authentication action is associated with at least the client device and a user account, and wherein the user account includes an account profile that stores user settings and paid content subscription information for the user account;
    matching the channel request and the account profile with an existing customized channel;
    generating a new customized channel associated with the account profile when a match is not found; and
    modifying the customized channel according to at least the account profile to make at least the user settings and the paid content subscription information of the account profile available within the customized channel,
    wherein the user settings and the paid content subscription information of the account profile are used to modify a presentation of the video content of the third party content provider within the customized channel and to prioritize the video content of the third party content provider within the customized channel.

20. The non-transitory computer-readable storage medium according to claim 19, the operations further comprising tracking the new customized channel within a channel store.

* * * * *